(12) United States Patent
Huang et al.

(10) Patent No.: US 10,944,464 B2
(45) Date of Patent: Mar. 9, 2021

(54) METHOD AND APPARATUS FOR SWITCHING ANALOG BEAM

(71) Applicant: HUAWEI TECHNOLOGIES CO., LTD., Guangdong (CN)

(72) Inventors: Yuqi Huang, Shanghai (CN); Youtuan Zhu, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/519,269

(22) Filed: Jul. 23, 2019

(65) Prior Publication Data

US 2019/0349064 A1 Nov. 14, 2019

Related U.S. Application Data

(63) Continuation of application No. PCT/CN2017/072516, filed on Jan. 24, 2017.

(51) Int. Cl.
*H04B 7/06* (2006.01)
*H04L 5/00* (2006.01)
*H04W 72/04* (2009.01)

(52) U.S. Cl.
CPC ......... *H04B 7/0695* (2013.01); *H04B 7/0626* (2013.01); *H04B 7/0632* (2013.01); *H04L 5/005* (2013.01); *H04W 72/0413* (2013.01); *H04B 7/0617* (2013.01)

(58) Field of Classification Search
CPC . H04W 72/0413; H04W 36/06; H04W 36/18; H04W 36/36; H04L 5/005; H04B 7/0695; H04B 7/0632; H04B 7/0617; H04B 7/0456; H04B 7/0626
See application file for complete search history.

(56) References Cited

U.S. PATENT DOCUMENTS

| | | | |
|---|---|---|---|
| 2006/0052139 A1 | 3/2006 | Teo et al. | |
| 2011/0105126 A1 | 5/2011 | Liang et al. | |
| 2013/0155847 A1* | 6/2013 | Li | H04W 76/10 370/225 |

(Continued)

FOREIGN PATENT DOCUMENTS

| | | |
|---|---|---|
| CN | 1493166 A | 4/2004 |
| CN | 104955061 A | 9/2015 |

(Continued)

OTHER PUBLICATIONS

Extended European Search Report issued in European Application No. 17894090.4 dated Apr. 12, 2019, 9 pages.

(Continued)

*Primary Examiner* — Brian D Nguyen
(74) *Attorney, Agent, or Firm* — Fish & Richardson P.C.

(57) ABSTRACT

Example methods and apparatus for switching an analog beam are described. One example method includes transmitting a data channel by a terminal by using a first analog beam. The terminal determines that a second analog beam is a target beam to be switched to. The terminal transmits a related signal of the data channel by using the second analog beam. The terminal transmits a data channel by using the first analog beam. The terminal switches from the first analog beam to the second analog beam to transmit the data channel in response to determining that a specified condition is met.

16 Claims, 4 Drawing Sheets

(56) References Cited

U.S. PATENT DOCUMENTS

| | | | |
|---|---|---|---|
| 2015/0382268 A1* | 12/2015 | Hampel | H04W 36/24 |
| | | | 455/436 |
| 2016/0345211 A1 | 11/2016 | Zhao et al. | |
| 2017/0207845 A1* | 7/2017 | Moon | H04B 7/0695 |
| 2018/0123675 A1 | 5/2018 | Shi et al. | |
| 2018/0343043 A1* | 11/2018 | Hakola | H04B 7/0417 |
| 2018/0359790 A1* | 12/2018 | Ingale | H04W 28/16 |
| 2019/0089420 A1* | 3/2019 | Koskela | H04B 7/0417 |

FOREIGN PATENT DOCUMENTS

| | | |
|---|---|---|
| CN | 105556869 A | 5/2016 |
| CN | 106063362 A | 10/2016 |
| WO | 2014107012 A1 | 7/2014 |

OTHER PUBLICATIONS

Office Action issued in Chinese Application No. 201780083867.X dated May 25, 2020, 13 pages (with English translation).
PCT International Search Report and Written Opinion in International Application No. PCT/CN2017072516, dated Oct. 19, 2017, 17 pages (With English Translation).

* cited by examiner

METHOD AND APPARATUS FOR SWITCHING ANALOG BEAM

CROSS-REFERENCE TO RELATED APPLICATIONS

This application is a continuation of International Application No. PCT/CN2017/072516, filed on Jan. 24, 2017, the disclosure of which is hereby incorporated by reference in its entirety.

TECHNICAL FIELD

This application relates to the field of communications technologies, and in particular, to a method and an apparatus for switching an analog beam.

BACKGROUND

With widespread application of intelligent terminals and continuous growth of new mobile service requirements, a required wireless transmission rate grows exponentially and spectrum resources become more demanding. In an existing idea, use of high-band spectrum resources is proposed. Because in a higher frequency band, a penetration capability of an electromagnetic wave is poorer, and energy attenuation is greater, a higher path loss is caused. To address a path loss, a base station and a terminal use a large antenna array plane to improve power and spectrum efficiency. Specifically, tens or even hundreds of antennas are arranged in a coverage area of the base station, and these antennas are centrally disposed in a form of a massive array. A plurality of terminals distributed in the coverage area of the base station concurrently communicate with the base station on a same time-frequency resource by using a spatial degree of freedom provided by massive antennas of the base station. In this way, utilization of spectrum resources is greatly improved.

Beamforming (BF) solutions are applied to a base station and a terminal in a large antenna array plane scenario. To be specific, transmission coverage of a corresponding terminal is implemented by using a terminal-oriented beamforming technology. The beamforming solutions may be classified into a digital beamforming solution and an analog beamforming solution based on whether a weight vector and a weight matrix or a precoding vector and a precoding matrix are used for a baseband or a radio frequency. If a conventional digital beamforming solution is used to implement a large antenna array plane, not only power consumption costs are high, but also complexity of signal processing performed by the baseband is high. Therefore, a hybrid BF solution is implemented in a two-stage weighted connection manner by using a phase shifter to drive an antenna element.

In the hybrid BF solution or the analog beamforming solution, to adapt to a channel change so that better channel quality is provided for communication, the base station and the terminal need to perform an analog beam alignment process. To be specific, a direction of an analog beam transmitted by the base station to the terminal is consistent with a direction of an analog beam used by the terminal. Specifically, the base station and the terminal separately perform analog beam sweeping by using a pilot signal, to separately select an analog beam with optimal channel quality. Currently, in the prior art, in an analog beam sweeping process, to obtain analog beams of the base station and the terminal more quickly and more accurately, the base station and the terminal need to be decoupled during an analog beam selection process. In other words, the base station does not need to know the analog beam selected by the terminal.

However, the terminal switches an analog beam during a location change process. Specifically, the terminal performs pilot measurement through beam sweeping, and once the terminal determines an optimal analog beam, the terminal switches analog beams for a data channel, a sounding channel, and a control channel. If a base station side does not know an analog beam selected by the terminal, when the terminal is switching the analog beam, within a period of time, uplink or downlink measurement is inaccurate, communication quality apparently deteriorates, system reliability is reduced, and even a network is interrupted, and system performance is affected.

SUMMARY

This application provides a method and an apparatus for switching an analog beam, to overcome inaccuracy in uplink and downlink measurement and deterioration of communication quality that are resulted when a terminal is switching an analog beam.

According to a first aspect, a method for switching an analog beam is provided. A method in which a terminal performs a soft handover by itself is used to change a condition to be met and a switching sequence of analog beams used by the terminal to transmit different signals or channels, thereby preventing deterioration of communication quality that is resulted from inaccuracy in uplink and downlink measurement when the terminal is switching an analog beam on a terminal side. In this way, system robustness is improved, and owing to rapid and accurate beam sweeping and tracking, system reliability is improved.

In a possible design, when transmitting a data channel by using a first analog beam and determining that a second analog beam is a target beam to be switched to, the terminal transmits a related signal of the data channel by using the second analog beam, and switches, if a specified condition is met, from the first analog beam to the second analog beam to transmit the data channel. The related signal of the data channel is used to inspect channel quality of the data channel. In this way, the analog beam is switched first, to transmit the related signal of the data channel, so that both the terminal and a base station can perform channel measurement for the second analog beam based on the related signal of the data channel, to obtain uplink and downlink data channels that match channel quality of the second analog beam, thereby ensuring communication quality and system reliability.

In a possible design, if the terminal determines that the second analog beam is the target beam to be switched to, and determines that an analog beam on a base station side does not need to be switched, the terminal first switches to the second analog beam, sends an uplink reference signal and an uplink control channel by using the second analog beam, sends an uplink data channel by using the first analog beam within a measurement period of the uplink reference signal, and switches, when the measurement period of the uplink reference signal ends, from the first analog beam to the second analog beam to send the uplink data channel, where the analog beam on the base station side is used for signal transmission between the base station and the terminal. In this way, the base station can accurately obtain downlink channel information of the second analog beam based on the uplink control channel sent by the terminal, so that the base station can schedule, based on accurate downlink measurement, the terminal that transmits a signal by using the second analog beam.

In a possible design, the uplink reference signal includes a sounding reference signal SRS, and in the measurement period of the uplink reference signal, the uplink reference signal is transmitted for one user frequency band.

In a possible design, if the terminal determines that the second analog beam is the target beam to be switched to, and determines that an analog beam on a base station side does not need to be switched, the terminal transmits the related signal of the data channel by using the second analog beam; and the terminal transmits the data channel by using the first analog beam, and when the specified condition is met, transmits the data channel by using the second analog beam. This is implemented in the following manner: The terminal sends an uplink reference signal by using the second analog beam, receives a downlink data channel by using the first analog beam within a measurement period of the uplink reference signal, and switches, when the measurement period of the uplink reference signal ends, from the first analog beam to the second analog beam to receive the downlink data channel. In a possible embodiment, the uplink reference signal is an SRS, and in the measurement period, the uplink reference signal is transmitted for one user frequency band. After the terminal sends SRSs on the second analog beam for one user frequency band, the base station may calculate a downlink DBF weight based on the SRSs sent by the terminal, to ensure that after the terminal switches to the second analog beam to receive a PDSCH, the base station sends the PDSCH by using a DBF weight that matches channel information, and communication quality is ensured. Alternatively, the terminal receives a downlink reference signal by using the second analog beam, receives a downlink data channel by using the first analog beam, and when the downlink reference signal is received and a parameter representing downlink channel quality is obtained based on the received downlink reference signal, switches from the first analog beam to the second analog beam to receive the downlink data channel. In a possible embodiment, the downlink reference signal is a CSI-RS. In this case, after receiving the CSI-RS by using the second analog beam, the terminal performs calculation based on the CSI-RS, and feeds back the parameter representing the downlink channel quality to the base station, to ensure that when the terminal switches to the second analog beam to receive a PDSCH, the base station can send the PDSCH by using a PMI weight that matches channel information, thereby ensuring communication quality.

In a possible design, the uplink reference signal includes a sounding reference signal SRS or an uplink beam reference signal UL-BRS, the downlink reference signal includes a reference signal CSI-RS, and the downlink data channel includes a physical downlink shared channel PDSCH.

In a possible design, if the terminal determines that an analog beam on a base station side also needs to be switched, for example, needs to be switched from a third analog beam to a fourth analog beam, the terminal transmits the related signal of the data channel by using the second analog beam, the terminal transmits the data channel by using the first analog beam, and switches, if a specified condition is met, from the first analog beam to the second analog beam to transmit the data channel. This is implemented in the following manner: The terminal sends an uplink reference signal by using the second analog beam; sends an uplink data channel and an uplink control channel by using the first analog beam, and receives a downlink data channel by using the first analog beam; and when indication information sent by the base station is received by using the first analog beam or after specified duration, switches from the first analog beam to the second analog beam to send the uplink data channel and the uplink control channel, and receives the downlink data channel by using the second analog beam. The indication information is used to represent that the base station has switched the analog beam on the base station side, for example, from the third analog beam to the fourth analog beam. In a possible implementation, the uplink reference signal includes a sounding reference signal SRS or a UL-BRS, the uplink control channel includes a physical uplink control channel PUCCH, and the uplink data channel includes a physical uplink shared channel PUSCH.

According to a second aspect, an apparatus for switching an analog beam is provided. The apparatus for switching an analog beam has a function of implementing behavior of the terminal according to the first aspect or any possible implementation of the first aspect. The function may be implemented by hardware, or may be implemented by corresponding software executed by hardware. The hardware or the software includes one or more modules corresponding to the foregoing function.

According to a third aspect, an apparatus for switching an analog beam is provided. The apparatus for switching an analog beam includes a transceiver, a processor, and a memory. The processor and the memory are connected by using a bus system. The processor is configured to execute code in the memory, and when the code is executed, the execution enables the processor to perform the method according to the first aspect or any possible implementation of the first aspect.

According to a fourth aspect, a computer storage medium is provided and configured to store a computer program. The computer program includes an instruction that is used to perform the method according to the first aspect or any possible implementation of the first aspect.

DESCRIPTION OF EMBODIMENTS

Embodiments of this application may be applied to a scenario in which BF is applied to a large antenna array plane, and may be applied to but is not limited to switching of an analog beam by a terminal and switching to a selected antenna by the terminal. The embodiments of this application are described by using switching of an analog beam as an example. However, all the methods may be applied to switching to a selected antenna by the terminal. In the embodiments of this application, in an application scenario in which an analog beam on a terminal side is transparent to a base station, a method in which a terminal performs a soft handover by itself is used, to change a switching condition to be met and a switching sequence of analog beams used by the terminal to transmit different signals or channels, thereby preventing deterioration of communication quality that is resulted from inaccuracy in uplink and downlink measurement when the terminal is switching the analog beam on the terminal side. In this way, system robustness is improved, and owing to rapid and accurate beam sweeping and tracking, system reliability is improved.

Figure 1:
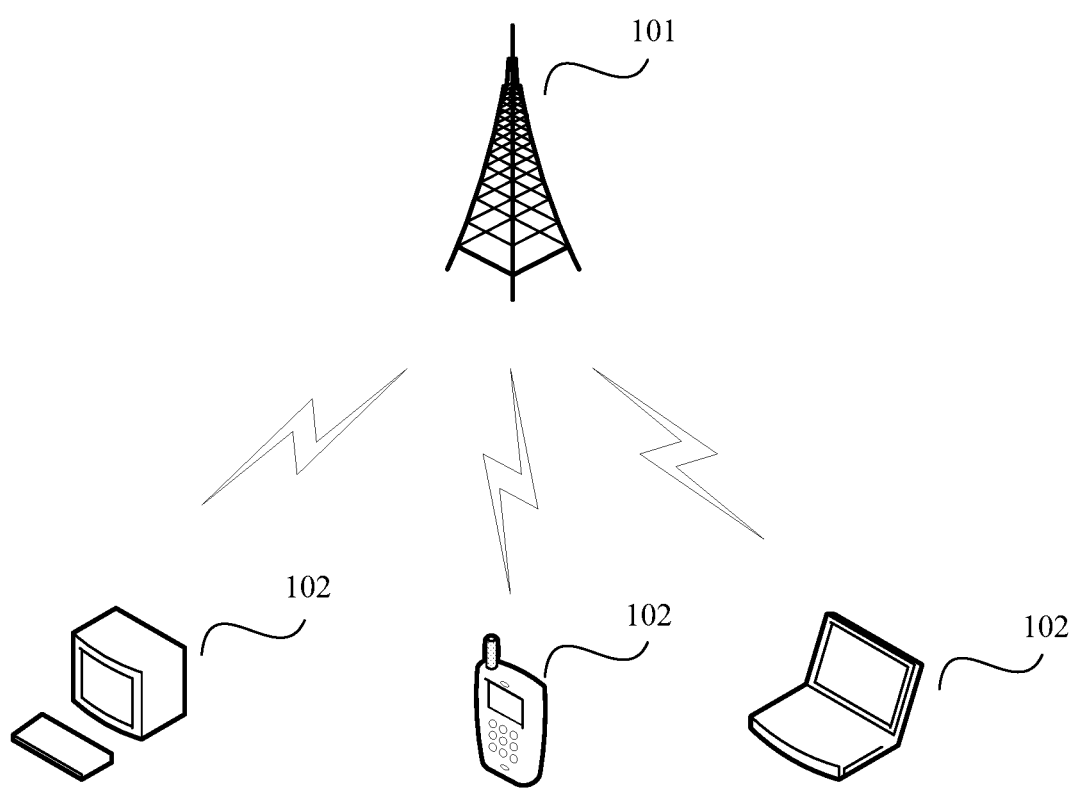
FIG. 1 is a schematic diagram of a system architecture to which an embodiment of this application is applied.

As shown in FIG. 1, a system architecture to which an embodiment of this application is applied includes a network device 101 and a terminal 102. The network device 101 may be a base station, or may be another network device having a function of a base station, and in particular, may be a terminal providing a function of a base station in device-to-device (D2D) communication. The base station is an apparatus deployed in a radio access network and configured to provide a wireless communication function for the terminal 102. The base station may include a macro base station, a micro base station, a relay station, an access point, and the like in various forms. The base station may be applied to different systems with a radio access technology, for example, an LTE system, a 5G communications system, and more possible communications systems. The terminal 102 may include various devices with a wireless communication function, for example, a handheld device, an in-vehicle device, a wearable device, a computing device, or another processing device connected to a wireless modem, and may be user equipments (UE), mobile stations (MS), and the like in various forms.

A method and an apparatus for switching an analog beam provided in the embodiments of this application are described below in detail with reference to accompanying drawings.

In a communication process between a terminal and a base station, analog beam alignment needs to be performed to obtain better channel quality. For the base station, analog beams used for signal transmission between the base station and the terminal include a transmit analog beam on a base station side and a receive analog beam on the base station side; for the terminal, analog beams used for signal transmission between the terminal and the base station include a transmit analog beam on a terminal side and a receive analog beam on the terminal side. The analog beam alignment means that the transmit analog beam on the base station side that is used by the base station to send a signal and the receive analog beam on the terminal side that is used by the terminal to receive a signal form an optimal analog beam pair, and the transmit analog beam on the terminal side that is used by the terminal to send a signal and the receive analog beam on the base station side that is used by the base station to receive a signal form an optimal analog beam pair. Generally, the transmit analog beam on the base station side and the receive analog beam on the base station side are a same analog beam, and the transmit analog beam on the terminal side and the receive analog beam on the terminal side are a same analog beam. The optimal analog beam pair is usually analog beams in a consistent beamforming direction. The base station may obtain a channel response by using an uplink reference signal sent by the terminal, calculate signal strength, for example, reference signal received power (RSRP), of analog beams of the terminal in all directions based on weights of analog beams in all beamforming directions, and selects an analog beam with strongest signal strength as the transmit analog beam on the base station side and the receive analog beam on the base station side. Alternatively, the base station determines an optimal analog beam on the base station side according to notification sent by a terminal by using an uplink control channel. The terminal sweeps pilot signals by using a beam sweeping subframe, to determine an optimal analog beam on the terminal side.

Figure 2:
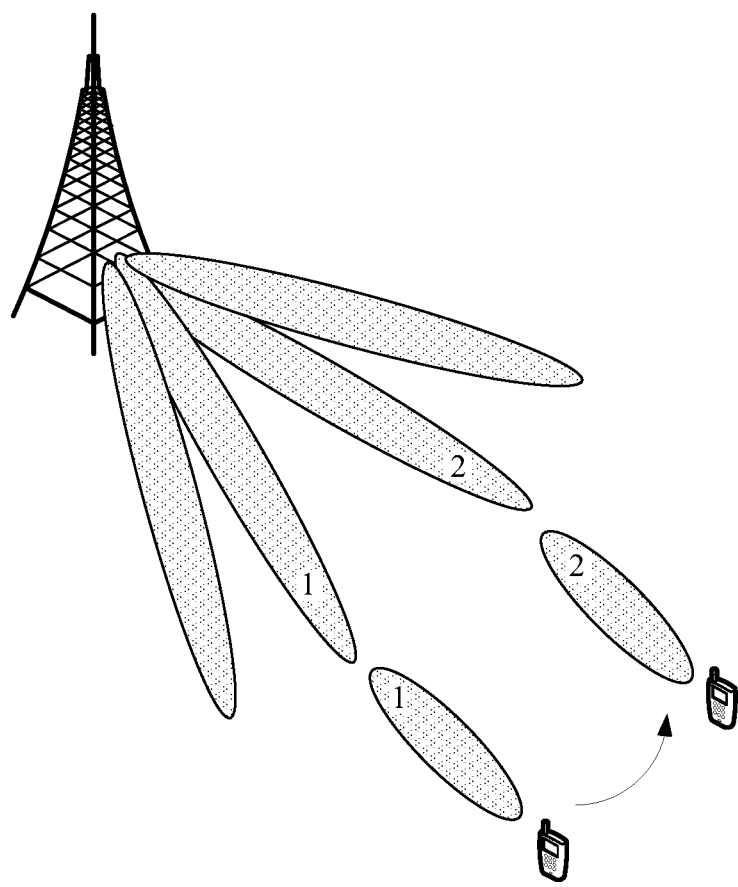
FIG. 2 is a schematic diagram of switching an analog beam according to an embodiment of this application.

As shown in FIG. 2, an optimal analog beam pair of a terminal and a base station is an analog beam 1, and when a location of the terminal changes or it is determined, based on a beam gain result, that the optimal analog beam pair changes to an analog beam 2, the terminal switches an analog beam, which is used for signal transmission, from the analog beam 1 to the analog beam 2. In this embodiment of this application, a switching sequence of analog beams used for transmitting channels or signals and a design of a switching condition to be met are adjusted, so that the terminal can perform a soft handover by itself to improve system reliability.

Figure 3:
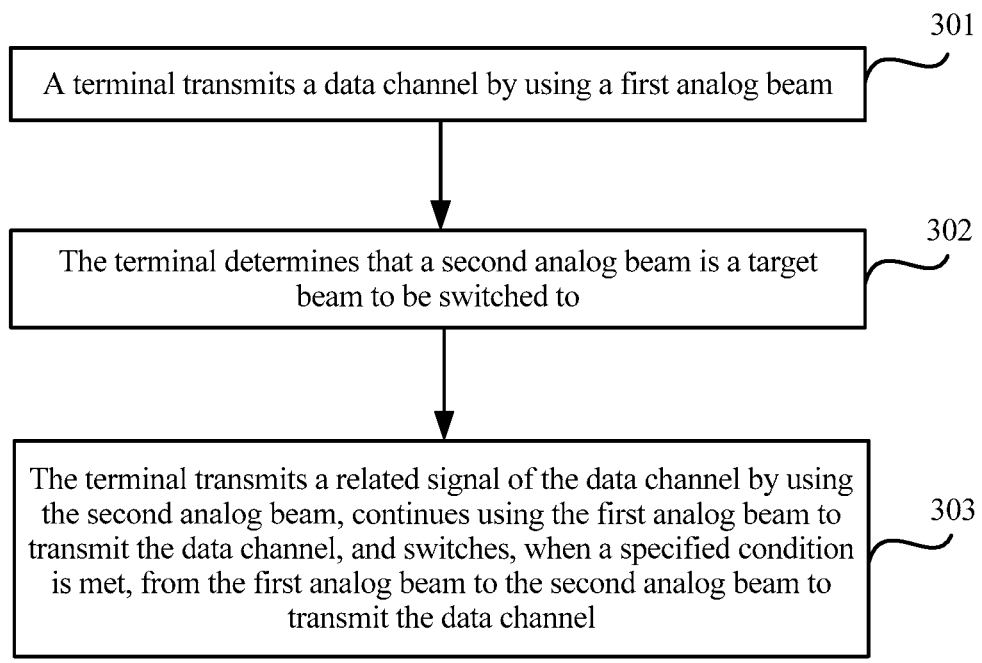
FIG. 3 is a flowchart of a method for switching an analog beam according to an embodiment of this application.

As shown in FIG. 3, in an embodiment of this application, a procedure of a method for switching an analog beam is as follows.

Step 301. A terminal transmits a data channel by using a first analog beam.

Specifically, the first analog beam is an optimal analog beam on a terminal side. The terminal sends and receives the data channel by using the first analog beam, and sends and receives a related signal of the data channel by using the first analog beam. The related signal of the data channel may be used by a base station and the terminal to inspect channel quality of the data channel corresponding to the first analog beam.

Step 302. The terminal determines that a second analog beam is a target beam to be switched to.

To be specific, when performing sweeping by using a beam sweeping subframe, the terminal determines that the optimal analog beam on the terminal side changes from the current first analog beam to a second analog beam. In actual application, the terminal is required to transmit and receive signals on the optimal analog beam on the terminal side, and when finding that the optimal analog beam for the terminal changes from a currently used analog beam to another target analog beam, the terminal is required to adjust a direction for transmitting a signal to the base station and a direction for receiving a signal from the base station by switching to the target analog beam, to transmit and receive a measurement channel, a control channel, and a data channel by using the target analog beam. In this embodiment of this application, transmitting and receiving the measurement channel, the control channel, and the data channel are not performed by immediately switching from the first analog beam to the second analog beam. An implementation manner in step 303 is used.

Step 303. The terminal transmits a related signal of the data channel by using the second analog beam, and switches, if a specified condition is met, from the first analog beam to the second analog beam to transmit the data channel. The related signal of the data channel is used to inspect channel quality of the data channel.

The following describes in detail the switching method in step 303.

If the terminal determines that an optimal analog beam on a base station side is unchanged; in other words, the analog beam on the base station side does not need to be switched, in an uplink direction:

The terminal sends related signals, to be specific, sends an uplink reference signal and an uplink control channel, of the data channel by using the second analog beam; and the terminal sends an uplink data channel by using the first analog beam within a measurement period of the uplink reference signal, and switches, when the measurement period of the uplink reference signal ends, from the first analog beam to the second analog beam to send the uplink data channel. The uplink reference signal is, for example, a sounding reference signal (SRS). The uplink control channel is, for example, a physical uplink control channel (PUCCH). The uplink data channel is, for example, a physical uplink shared channel (PUSCH).

Specifically, when determining that the second analog beam is the target beam to be switched to, the terminal first switches an analog beam used for sending the SRS and the PUCCH, from the first analog beam to the second analog beam, but continues using the first analog beam to send the PUSCH. After sending SRSs for one user frequency band on the second analog beam, the terminal switches from the first analog beam to the second analog beam to send the PUSCH. In other words, after the terminal sends the SRSs for one user frequency band on the second analog beam, the base station may measure uplink 3Is on the second analog beam based on the SRSs sent by the terminal. The 3Is include a precoding matrix indicator (PMI), a channel quality indicator (CQI), and channel state rank information (RI). The base station obtains a correct selected PMI, RI, and MCS (modulation and coding scheme) based on a 3I measurement result, and obtains a measurement result corresponding to the second analog beam. When the terminal switches from the first analog beam to the second analog beam to send the PUSCH, the base station may properly process the PUSCH by using the measurement result corresponding to the second analog beam, so that a PMI and an MCS of the PUSCH match channel quality of the second analog beam, and uplink communication quality is ensured.

The PUCCH is used to feed back downlink channel information, for example, a downlink CQI and a downlink RI. The base station may correctly obtain downlink channel information of the second analog beam based on the PUCCH sent by the terminal, so that the base station can schedule, based on correct downlink measurement, the terminal that transmits a signal by using the second analog beam.

In a Downlink Direction:

The terminal switches from the first analog beam to the second analog beam to send an uplink reference signal, for example, an SRS; and the terminal continues using the first analog beam to receive a downlink data channel within a measurement period of the uplink reference signal; and switches, when the measurement period of the uplink reference signal ends, from the first analog beam to the second analog beam to receive the downlink data channel. Alternatively, the terminal switches from the first analog beam to the second analog beam to receive a downlink reference signal, for example, receive a channel state information reference signal (CSI-RS); and the terminal continues using the first analog beam to receive a downlink data channel, and when the downlink reference signal is received, a downlink PMI is obtained based on the received downlink reference signal, and the downlink PMI is fed back, switches from the first analog beam to the second analog beam to receive the downlink data channel.

Specifically, in a downlink BF mode, when determining that the second analog beam is the target beam to be switched to, the terminal first switches, to the second analog beam, an analog beam used for sending the SRS, so as to send the SRS by using the second analog beam, and continues receiving a PDSCH by using the first analog beam. After sending SRSs for one user frequency band on the second analog beam, the terminal switches from the first analog beam to the second analog beam to receive the PDSCH. In other words, after the terminal sends the SRSs for one user frequency band on the second analog beam, the base station may calculate a downlink DBF weight based on the SRSs sent by the terminal, to ensure that after the terminal switches to the second analog beam to receive the PDSCH, the base station sends the PDSCH by using a DBF weight that matches channel information, thereby ensuring communication quality.

In a downlink closed-loop spatial multiplexing mode, when determining that the second analog beam is the target beam to be switched to, the terminal first switches an analog beam for receiving a CSI-RS to the second analog beam, and after receiving the CSI-RS by using the second analog beam, performs calculation based on the CSI-RS, and feeds back the parameter representing the downlink channel quality to the base station, for example, a downlink PMI or a downlink CQI, and then switches from the first analog beam to the second analog beam to receive the PDSCH. This ensures that when the terminal switches from the first analog beam to the second analog beam to receive the PDSCH, the base station can send the PDSCH by using a PMI weight that matches channel information, thereby ensuring communication quality.

If the terminal determines that an analog beam on a base station side also needs to be switched, for example, from a third analog beam to a fourth analog beam:

When determining that the second analog beam is the target beam to be switched to, the terminal first switches from the first analog beam to the second analog beam to send an uplink reference signal, for example, an SRS or an uplink beam reference signal (UL-BRS); and the terminal continues using the first analog beam to send an uplink data channel and an uplink control channel, and receiving a downlink data channel by using the first analog beam, and when indication information sent by the base station is received by using the first analog beam or after specified duration, switches from the first analog beam to the second analog beam to send the uplink data channel and the uplink control channel, and switches from the first analog beam to the second analog beam to receive the downlink data channel. The indication information is used to represent that the base station has switched the analog beam on the base station side, for example, from the third analog beam to the fourth analog beam.

Specifically, when the terminal finds that an optimal analog beam on the base station side also needs to be switched, the terminal may notify the base station of a latest optimal analog beam on the base station side in two manners. For example, the terminal first switches to the second analog beam to send the UL-BRS, and the base station performs beam sweeping, receives the UL-BRS by using different analog beams, obtains channel responses of the analog beams, and obtains an analog beam with best channel quality, in other words, the latest optimal analog beam on the base station side, the fourth analog beam; or when finding that the optimal analog beam on the base station side also needs to be switched, the terminal sends, by using the first analog beam, a PUCCH to the base station to feed back a latest optimal analog beam on the base station side, in other words, the fourth analog beam, and the base station receives, by using the third analog beam, the PUCCH sent by the terminal, to obtain the latest optimal analog beam on the base station side, in other words, the fourth analog beam.

When the terminal determines that the second analog beam is the target beam to be switched to and the optimal analog beam on the base station side also needs to be switched, the terminal first switches to the second analog beam to send the SRS, and continues using the first analog beam to send the PUCCH and the PUSCH, and the base station continues using the third analog beam to receive the PUCCH and the PUSCH. After the terminal sends SRSs for one user frequency band, the base station may measure uplink 3Is or calculate a downlink weight by using the received SRSs and the obtained fourth analog beam, and send a downlink control channel, for example, an ePDCCH, by using the third analog beam, to indicate, to the terminal, that the base station side has switched to the latest optimal analog beam. After receiving the indication, the terminal switches from the first analog beam to the second analog beam to send the PUSCH and receive the PDSCH.

In addition, the terminal may switch, after specified duration, from the first analog beam to the second analog beam to send the PUSCH and receive the PDSCH.

Figure 4:
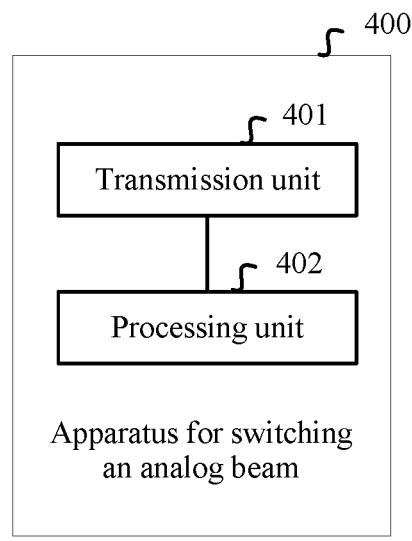
FIG. 4 is a structural diagram 1 of an apparatus for switching an analog beam according to an embodiment of this application.

Based on a same inventive concept with the method for switching an analog beam shown in FIG. 3, as shown in FIG. 4, an embodiment of this application further provides an apparatus 400 for switching an analog beam, including a transmission unit 401 and a processing unit 402.

The transmission unit 401 is configured to transmit a data channel by using a first analog beam.

The processing unit 402 is configured to determine that a second analog beam is a target beam to be switched to.

The transmission unit 401 is further configured to: when the processing unit 402 determines that the second analog beam is the target beam to be switched to, transmit a related signal of the data channel by using the second analog beam; and switch, if a specified condition is met, from the first analog beam to the second analog beam to transmit the data channel. The related signal of the data channel is used to inspect channel quality of the data channel.

Optionally, the processing unit 402 is further configured to determine that an analog beam on a base station side does not need to be switched, where the analog beam on the base station side is used for signal transmission between a base station and the terminal; and the transmission unit 401 is configured to: if the processing unit 402 determines that the analog beam on the base station side does not need to be switched, send an uplink reference signal and an uplink control channel by using the second analog beam, send an uplink data channel by using the first analog beam within a measurement period of the uplink reference signal, and switch, when the measurement period of the uplink reference signal ends, from the first analog beam to the second analog beam to send the uplink data channel.

Optionally, the processing unit 402 is further configured to determine that an analog beam on a base station side does not need to be switched, where the analog beam on the base station side is used for signal transmission between a base station and the terminal; and the transmission unit 401 is configured to: if the processing unit 402 determines that the analog beam on the base station side does not need to be switched, send an uplink reference signal by using the second analog beam, receive a downlink data channel by using the first analog beam within a measurement period of the uplink reference signal, and switch, when the measurement period of the uplink reference signal ends, from the first analog beam to the second analog beam to receive the downlink data channel; or receive a downlink reference signal by using the second analog beam, receive a downlink data channel by using the first analog beam, and when the downlink reference signal is received and a parameter representing downlink channel quality is obtained based on the received downlink reference signal, switch from the first analog beam to the second analog beam to receive the downlink data channel.

Optionally, the uplink reference signal includes a sounding reference signal SRS or an uplink beam reference signal UL-BRS, the downlink reference signal includes a reference signal CSI-RS, and the downlink data channel includes a physical downlink shared channel PDSCH.

Optionally, the processing unit 402 is further configured to determine that an analog beam on a base station side needs to be switched, for example, from a third analog beam to a fourth analog beam, where the analog beam on the base station side is used for signal transmission between a base station and the apparatus; and the transmission unit 401 is further configured to: if the processing unit 402 determines that the analog beam on the base station side needs to be switched, for example, from the third analog beam to the fourth analog beam, send an uplink reference signal by using the second analog beam; send an uplink data channel and an uplink control channel by using the first analog beam, and receive a downlink data channel by using the first analog beam; and when indication information sent by the base station is received by using the first analog beam or after specified duration, switch from the first analog beam to the second analog beam to send the uplink data channel and the uplink control channel, and switch from the first analog beam to the second analog beam to receive the downlink data channel, where the indication information is used to represent that the base station has switched the analog beam on the base station side, for example, from the third analog beam to the fourth analog beam.

Optionally, the uplink reference signal includes a sounding reference signal SRS or a UL-BRS, the uplink control channel includes a physical uplink control channel PUCCH, and the uplink data channel includes a physical uplink shared channel PUSCH.

Figure 5:
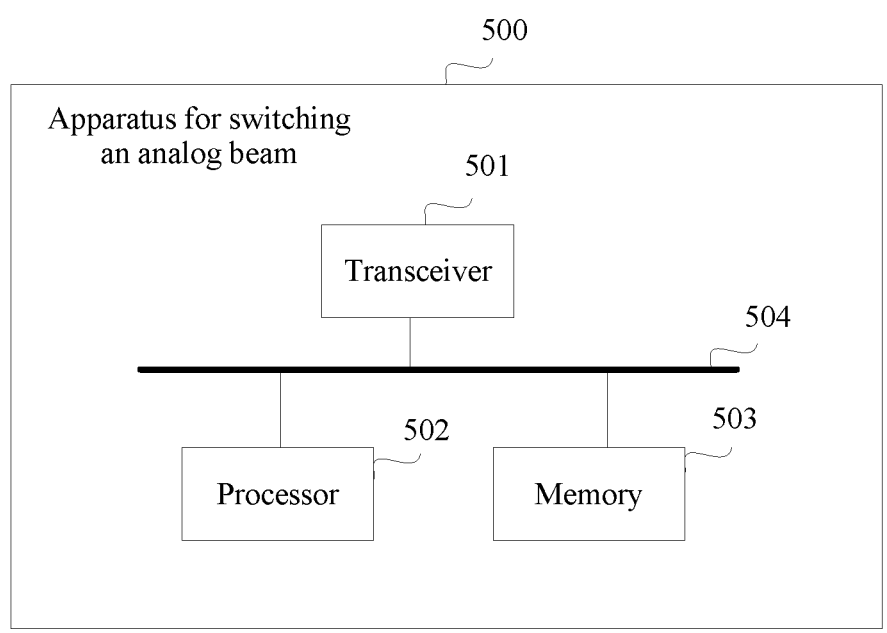
FIG. 5 is a structural diagram 2 of an apparatus for switching an analog beam according to an embodiment of this application.

Based on a same inventive concept with the method for switching an analog beam shown in FIG. 3, as shown in FIG. 5, an embodiment of this application further provides an apparatus 500 for switching an analog beam, including a transceiver 501, a processor 502, a memory 503, and a bus 504. The transceiver 501, the processor 502, and the memory 503 each are connected to the bus 504. The memory 503 stores a program. The processor 502 is configured to invoke the program stored in the memory 503, and when the program is executed, the processor 502 is enabled to perform the following operations:

transmitting a data channel by using a first analog beam; and determining that a second analog beam is a target beam to be switched to; and when it is determined that the second analog beam is the target beam to be switched to, transmitting a related signal of the data channel by using the second analog beam; and switching, if a specified condition is met, from the first analog beam to the second analog beam to transmit the data channel.

Optionally, the processor 502 is further configured to: determine that an analog beam on a base station side does not need to be switched, where the analog beam on the base station side is used for signal transmission between a base station and the terminal; and if it is determined that the analog beam on the base station side does not need to be switched, send an uplink reference signal and an uplink control channel by using the second analog beam, send an uplink data channel by using the first analog beam within a measurement period of the uplink reference signal, and switch, when the measurement period of the uplink reference signal ends, from the first analog beam to the second analog beam to send the uplink data channel, where the analog beam on the base station side is used for signal transmission between the base station and the terminal.

Optionally, the processor 502 is further configured to: determine that an analog beam on a base station side does not need to be switched, where the analog beam on the base station side is used for signal transmission between a base station and the terminal; and if it is determined that the analog beam on the base station side does not need to be switched, send an uplink reference signal by using the second analog beam, receive a downlink data channel by using the first analog beam within a measurement period of the uplink reference signal, and switch, when the measurement period of the uplink reference signal ends, from the first analog beam to the second analog beam to receive the downlink data channel, where the analog beam on the base station side is used for signal transmission between the base station and the terminal; or receive a downlink reference signal by using the second analog beam, receive a downlink data channel by using the first analog beam, and when the downlink reference signal is received and a parameter representing downlink channel quality is obtained based on the received downlink reference signal, receive the downlink data channel by using the second analog beam.

Optionally, the uplink reference signal includes a sounding reference signal SRS or an uplink beam reference signal UL-BRS, the downlink reference signal includes a reference signal CSI-RS, and the downlink data channel includes a physical downlink shared channel PDSCH.

Optionally, the processor 502 is further configured to determine that an analog beam on a base station side needs to be switched, for example, from a third analog beam to a fourth analog beam, where the analog beam on the base station side is used for signal transmission between a base station and the apparatus; and the transceiver 501 is further configured to: if the processor 502 determines that the analog beam on the base station side needs to be switched, for example, from the third analog beam to the fourth analog beam, send an uplink reference signal by using the second analog beam; send an uplink data channel and an uplink control channel by using the first analog beam, and receive a downlink data channel by using the first analog beam; and when indication information sent by the base station is received by using the first analog beam or after specified duration, switch from the first analog beam to the second analog beam to send the uplink data channel and the uplink control channel, and switch from the first analog beam to the second analog beam to receive the downlink data channel, where the indication information is used to represent that the base station has switched the analog beam on the base station side, for example, from the third analog beam to the fourth analog beam.

Optionally, the uplink reference signal includes a sounding reference signal SRS or a UL-BRS, the uplink control channel includes a physical uplink control channel PUCCH, and the uplink data channel includes a physical uplink shared channel PUSCH.

The processor 502 may be a central processing unit (CPU), a network processor (NP), or a combination of a CPU and an NP.

The processor 502 may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof.

The memory 503 may include a volatile memory, for example, a random-access memory (RAM). Alternatively, the memory 503 may include a non-volatile memory, for example, a flash memory, a hard disk drive (HDD), or a solid-state drive (SSD). Alternatively, the memory 503 may include a combination of the foregoing types of memories.

The apparatus 400 for switching an analog beam shown in FIG. 4 and the apparatus 500 for switching an analog beam shown in FIG. 5 are configured to perform the method for switching an analog beam shown in FIG. 3, and may be deployed in a terminal. The processing unit 402 in FIG. 4 may be implemented by the processor 502 in FIG. 5, and the transmission unit 401 in FIG. 4 may be implemented by the transceiver 501 in FIG. 5.

Persons skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or other programmable data processing devices, so that a series of operations and steps are performed on the computer or the other programmable devices, thereby generating computer-implemented processing. Therefore, the instructions executed on the computer or the other programmable devices provide steps for implementing a specific function in one or more processes in the flowcharts and/or in one or more blocks in the block diagrams.

Although some embodiments of this application have been described, persons skilled in the art can make changes and modifications to these embodiments once they learn the basic inventive concept. Therefore, the following claims are intended to cover the preferred embodiments and all changes and modifications falling within the scope of this application.

Apparently, persons skilled in the art can make various modifications and variations to the embodiments of this application without departing from the scope of the embodiments of this application. This application is intended to cover these modifications and variations made to the embodiments of this application provided that they fall within the scope defined by the following claims and their equivalent technologies of this application.

What is claimed is:

1. A method for switching an analog beam, the method comprising:
   transmitting, by a terminal, a data channel by using a first analog beam;
   determining, by the terminal, that a second analog beam is a target beam to be switched to;
   in response to determining that the second analog beam is a target beam to be switched to, determining, by the terminal, whether an analog beam on a base station side needs to be switched;
   transmitting, by the terminal, a related signal of the data channel by using the second analog beam based at least on a determination of whether the analog beam on the base station side needs to be switched, wherein the related signal of the data channel is used to inspect channel quality of the data channel; and
   switching, by the terminal and in response to determining that a specified condition is met, from the first analog beam to the second analog beam to transmit the data channel.

2. The method according to claim 1, wherein the transmitting, by the terminal, a related signal of the data channel by using the second analog beam and the switching, by the terminal and in response to determining that a specified condition is met, from the first analog beam to the second analog beam to transmit the data channel comprise:
   determining, by the terminal, that an analog beam on a base station side does not need to be switched, wherein the analog beam on the base station side is used for signal transmission between a base station and the terminal;
   switching, by the terminal, from the first analog beam to the second analog beam to send an uplink reference signal and an uplink control channel;
   sending, by the terminal, an uplink data channel by using the first analog beam within a measurement period of the uplink reference signal; and
   switching, when the measurement period of the uplink reference signal ends, from the first analog beam to the second analog beam to send the uplink data channel.

3. The method according to claim 1, wherein the transmitting, by the terminal, a related signal of the data channel by using the second analog beam and the switching, by the terminal and in response to determining that a specified condition is met, from the first analog beam to the second analog beam to transmit the data channel comprise:
   determining, by the terminal, that an analog beam on a base station side does not need to be switched, wherein the analog beam on the base station side is used for signal transmission between a base station and the terminal;
   switching, by the terminal, from the first analog beam to the second analog beam to send an uplink reference signal;
   receiving, by the terminal, a downlink data channel by using the first analog beam within a measurement period of the uplink reference signal; and
   switching, when the measurement period of the uplink reference signal ends, from the first analog beam to the second analog beam to receive the downlink data channel.

4. The method according to claim 3, wherein:
   the uplink reference signal comprises a sounding reference signal (SRS) or an uplink beam reference signal (UL-BRS), and
   the downlink data channel comprises a physical downlink shared channel (PDSCH).

5. The method according to claim 1, wherein the transmitting, by the terminal, a related signal of the data channel by using the second analog beam and the switching, by the terminal and in response to determining that a specified condition is met, from the first analog beam to the second analog beam to transmit the data channel comprise:
   determining, by the terminal, that an analog beam on a base station side does not need to be switched, wherein the analog beam on the base station side is used for signal transmission between a base station and the terminal;
   switching, by the terminal, from the first analog beam to the second analog beam to receive a downlink reference signal;
   receiving, by the terminal, a downlink data channel by using the first analog beam; and
   when the downlink reference signal is received and a parameter representing downlink channel quality is obtained based on the received downlink reference signal, switching from the first analog beam to the second analog beam to receive the downlink data channel.

6. The method according to claim 5, wherein:
   the downlink reference signal comprises a reference signal (CSI-RS), and
   the downlink data channel comprises a physical downlink shared channel (PDSCH).

7. The method according to claim 1, wherein the transmitting, by the terminal, a related signal of the data channel by using the second analog beam and the switching, by the terminal and in response to determining that a specified condition is met, from the first analog beam to the second analog beam to transmit the data channel comprise:
   determining, by the terminal, that an analog beam on a base station side needs to be switched, wherein the analog beam on the base station side is used for signal transmission between a base station and the terminal;
   sending, by the terminal, an uplink reference signal by using the second analog beam;
   sending, by the terminal, an uplink data channel and an uplink control channel by using the first analog beam;
   receiving a downlink data channel by using the first analog beam;
   when indication information sent by the base station is received by using the first analog beam or after specified duration, sending the uplink data channel and the uplink control channel by using the second analog beam; and
   receiving the downlink data channel by using the second analog beam, wherein the indication information is used to represent that the base station has switched the analog beam on the base station side.

8. The method according to claim 7, wherein:
the uplink reference signal comprises a sounding reference signal (SRS) or a UL-BRS,
the uplink control channel comprises a physical uplink control channel (PUCCH), and
the uplink data channel comprises a physical uplink shared channel (PUSCH).

9. An apparatus for switching an analog beam, the apparatus comprising:
at least one processor; and
a non-transitory computer-readable storage medium coupled to the at least one processor and storing programming instructions for execution by the at least one processor, the programming instructions instructing the at least one processor to:
transmit a data channel by using a first analog beam;
determine that a second analog beam is a target beam to be switched to;
in response to determining that the second analog beam is a target beam to be switched to, determine whether an analog beam on a base station side needs to be switched;
when the second analog beam is the target beam to be switched to, transmit a related signal of the data channel by using the second analog beam based at least on a determination of whether the analog beam on the base station side needs to be switched, wherein the related signal of the data channel is used to inspect channel quality of the data channel; and
switch, in response to determining that a specified condition is met, from the first analog beam to the second analog beam to transmit the data channel.

10. The apparatus according to claim 9, wherein the programming instructions instruct the at least one processor to:
determine that an analog beam on a base station side does not need to be switched, wherein the analog beam on the base station side is used for signal transmission between a base station and the apparatus;
in response to determining that the analog beam on the base station side does not need to be switched, send an uplink reference signal and an uplink control channel by using the second analog beam;
send an uplink data channel by using the first analog beam within a measurement period of the uplink reference signal; and
switch, when the measurement period of the uplink reference signal ends, from the first analog beam to the second analog beam to send the uplink data channel.

11. The apparatus according to claim 9, wherein the programming instructions instruct the at least one processor to:
determine that an analog beam on a base station side does not need to be switched, wherein the analog beam on the base station side is used for signal transmission between a base station and the apparatus;
in response to determining that the analog beam on the base station side does not need to be switched, send an uplink reference signal by using the second analog beam;
receive a downlink data channel by using the first analog beam within a measurement period of the uplink reference signal; and
switch, when the measurement period of the uplink reference signal ends, from the first analog beam to the second analog beam to receive the downlink data channel.

12. The apparatus according to claim 11, wherein:
the uplink reference signal comprises a sounding reference signal (SRS) or an uplink beam reference signal (UL-BRS), and
the downlink data channel comprises a physical downlink shared channel (PDSCH).

13. The apparatus according to claim 9, wherein the programming instructions instruct the at least one processor to:
determine that an analog beam on a base station side does not need to be switched, wherein the analog beam on the base station side is used for signal transmission between a base station and the apparatus;
receive a downlink reference signal by using the second analog beam;
receive a downlink data channel by using the first analog beam; and
when the downlink reference signal is received and a parameter representing downlink channel quality is obtained based on the received downlink reference signal, switch from the first analog beam to the second analog beam to receive the downlink data channel.

14. The apparatus according to claim 13, wherein:
the downlink reference signal comprises a reference signal (CSI-RS), and
the downlink data channel comprises a physical downlink shared channel (PDSCH).

15. The apparatus according to claim 9, wherein the programming instructions instruct the at least one processor to:
determine that an analog beam on a base station side needs to be switched, wherein the analog beam on the base station side is used for signal transmission between a base station and the apparatus;
in response to determining that the analog beam on the base station side needs to be switched, send an uplink reference signal by using the second analog beam;
send an uplink data channel and an uplink control channel by using the first analog beam;
receive a downlink data channel by using the first analog beam;
when indication information sent by the base station is received by using the first analog beam or after specified duration, switch from the first analog beam to the second analog beam to send the uplink data channel and the uplink control channel; and
receive the downlink data channel by using the second analog beam, wherein the indication information is used to represent that the base station has switched the analog beam on the base station side.

16. The apparatus according to claim 15, wherein:
the uplink reference signal comprises a sounding reference signal (SRS) or a UL-BRS,
the uplink control channel comprises a physical uplink control channel (PUCCH), and
the uplink data channel comprises a physical uplink shared channel (PUSCH).

* * * * *